United States Patent
Serkowski (12)

(10) Patent No.: US 6,513,121 B1
(45) Date of Patent: Jan. 28, 2003

(54) SECURING FEATURE ACTIVATION IN A TELECOMMUNICATION SYSTEM

(75) Inventor: Robert J. Serkowski, Broomfield, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/357,679

(22) Filed: Jul. 20, 1999

(51) Int. Cl.[7] .............................................. G06F 12/14
(52) U.S. Cl. ........................... 713/201; 713/200; 717/1; 209/229; 209/203
(58) Field of Search ................................ 709/203, 312, 709/229; 710/200; 705/59; 714/39; 717/1, 3, 4, 11; 713/200, 201

(56) References Cited

U.S. PATENT DOCUMENTS

| | | | | |
|---|---|---|---|---|
| 4,780,821 A | * | 10/1988 | Crossley | 364/200 |
| 5,204,897 A | | 4/1993 | Wyman | 380/4 |
| 5,553,143 A | * | 9/1996 | Ross et al. | 380/25 |
| 5,742,757 A | * | 4/1998 | Hamadani et al. | 713/200 |
| 5,790,664 A | | 8/1998 | Coley et al. | 380/4 |
| 5,905,860 A | | 5/1999 | Olsen et al. | 395/187 |
| 6,023,766 A | * | 2/2000 | Yamamura | 713/201 |

* cited by examiner

*Primary Examiner*—James P. Trammell
*Assistant Examiner*—Pierre E. Elisca
(74) *Attorney, Agent, or Firm*—John C. Moran

(57) ABSTRACT

Periodically sending by a telecommunication controlled application an encrypted message to a licensed server to request permission to run and to obtain a list of permitted features. The license server application is executing on the same processor as the controlled application. Also resident on the same system is a license file which contains a list of applications that are permitted to run, the version number of the permitted applications and a list of permitted features. The license server is responsive to the encrypted message from the controlled application to read and decrypt the license file, read the serial number of the processor controlling the telecommunications system, compare the serial number obtained from the processor with the serial number stored in the license file. If there is a mis-match, no license is granted to the control applications and it will not be allowed to run. If the serial numbers match, then a comparison is made between the version number received from the application and the corresponding version number associated with the application in the license file. If the version number mismatches, an encrypted message is sent to the application denying it permission to run. If the version number matches, an encrypted message is sent to the application granting it permission to run and listing the permitted features. To decrypt the license file, the license server utilizes a key that is assigned to the license server either globally or on a per system basis.

13 Claims, 3 Drawing Sheets

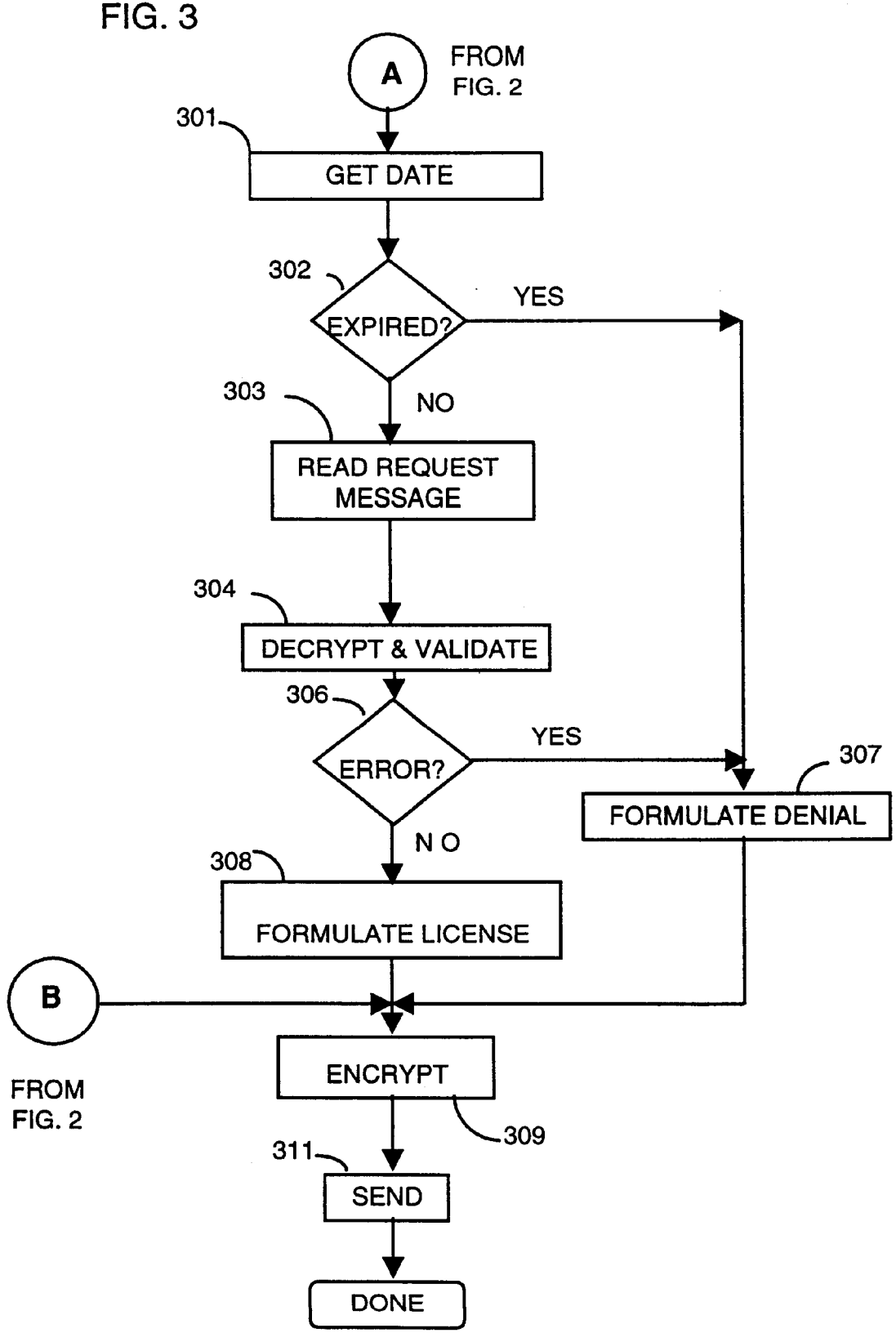

SECURING FEATURE ACTIVATION IN A TELECOMMUNICATION SYSTEM

TECHNICAL FIELD

This invention relates to the securing of programs and tables and, in particular, to protecting actuation of features and software within a telecommunication switching system.

BACKGROUND OF THE INVENTION

Within the prior art, it is well known to sell or lease software both from the point of view of the basic program and from the features that the program is allowed to implement. Normally, each release or version of a particular software package for a customer premise telecommunication switching system contains a large number of features; however, the customer chooses and pays for only a subset of the total number of features. Features in a telecommunications switching system refer to certain specialized operations such as call hold, call transfer, automatic route selection, etc. An ongoing problem in the art is to prevent newer versions of the software from being pirated and used on unauthorized switching system or the customer actuating features for which the customer has not paid. Within telecommunications switching systems in the prior art, these problems have been addressed by using passwords that only allow authorized individuals to have access to the telecommunication switching system for enabling features or new software versions.

The problem of securing software is a common problem throughout the computer industry as well. Three methods have been utilized to address this problem. One is to distribute the software utilizing a CD-Rom and to include a key that must be entered to enable the software program. This solution does not solve the copying problem since the key is normally printed on the CD-Rom cover, and anyone can install the software as many times as they wish, however illegal it may be. A second method is to use a special piece of hardware that is commonly referred to as "dongle". The dongle is a special piece of hardware that connects to the serial or parallel port of the computer. The software executing on the computer sends a random number to the dongle. The dongle performs a secret computation and returns a result. The software makes a like computation; if the two computations match, the software continues to run. To work satisfactorily, the response must include feature and version information. The use of the dongle is cumbersome when it fails. If the dongle fails, then the system is down until a new dongle can be physically obtained on site. Also, once made, the dongle is fixed. If it was used for feature activation, a new dongle is required for each additional feature that is purchased.

A third method (as described in PC Magazine, p. 35, December, 1998) is to freely distribute the CD-Rom disks. When the CD-Rom is inserted into a computer, the computer automatically connects to a remote server via the Internet or a dial up connection to receive a machine-specific key. The key unlocks the software so that it can be utilized on that computer. The remote server also obtains the necessary payment information from the computer user. The third method does not function well for a telecommunication switching system since it does not provide for the authorization to use different features of the same software application nor is it dependent on the version of the software being requested. In addition, it does not provide the necessary authorization of personnel to make such a request.

SUMMARY OF THE INVENTION

A departure in the art is achieved by an apparatus in method where a controlled application, such as a telecommunication application, periodically sends an encrypted message to a license server to request permission to run and to obtain a list of permitted features. The license server application is executing on the same processor as the controlled application. Also resident on the same system is a license file which contains a list of applications that are permitted to run, the version number of the permitted applications and a list of permitted features. The license server is responsive to the encrypted message from the control application to read and decrypt the license file, read the serial number of the processor controlling the telecommunications system, compare the serial number obtained from the processor with the serial number stored in the license file. If there is a mis-match, no license is granted to the control applications and it will not be allowed to run. If the serial numbers match, then a comparison is made between the version number received from the application and the corresponding version number associated with the application in the license file. If the version number mismatches, an encrypted message is sent to the application denying it permission to run. If the version number matches, an encrypted message is sent to the application granting it permission to run and listing the permitted features. To decrypt the license file, the license server utilizes a key that is assigned to the license server either globally or on a per system basis.

Other and further aspects of the present invention will become apparent in the course of the following description and by reference to the accompanying drawing.

BRIEF DESCRIPTION OF THE DRAWING

Referring now to the drawing:

FIG. 3 illustrates, in flow chart form, steps performed by a remote database.

DETAILED DESCRIPTION

Figure 1:
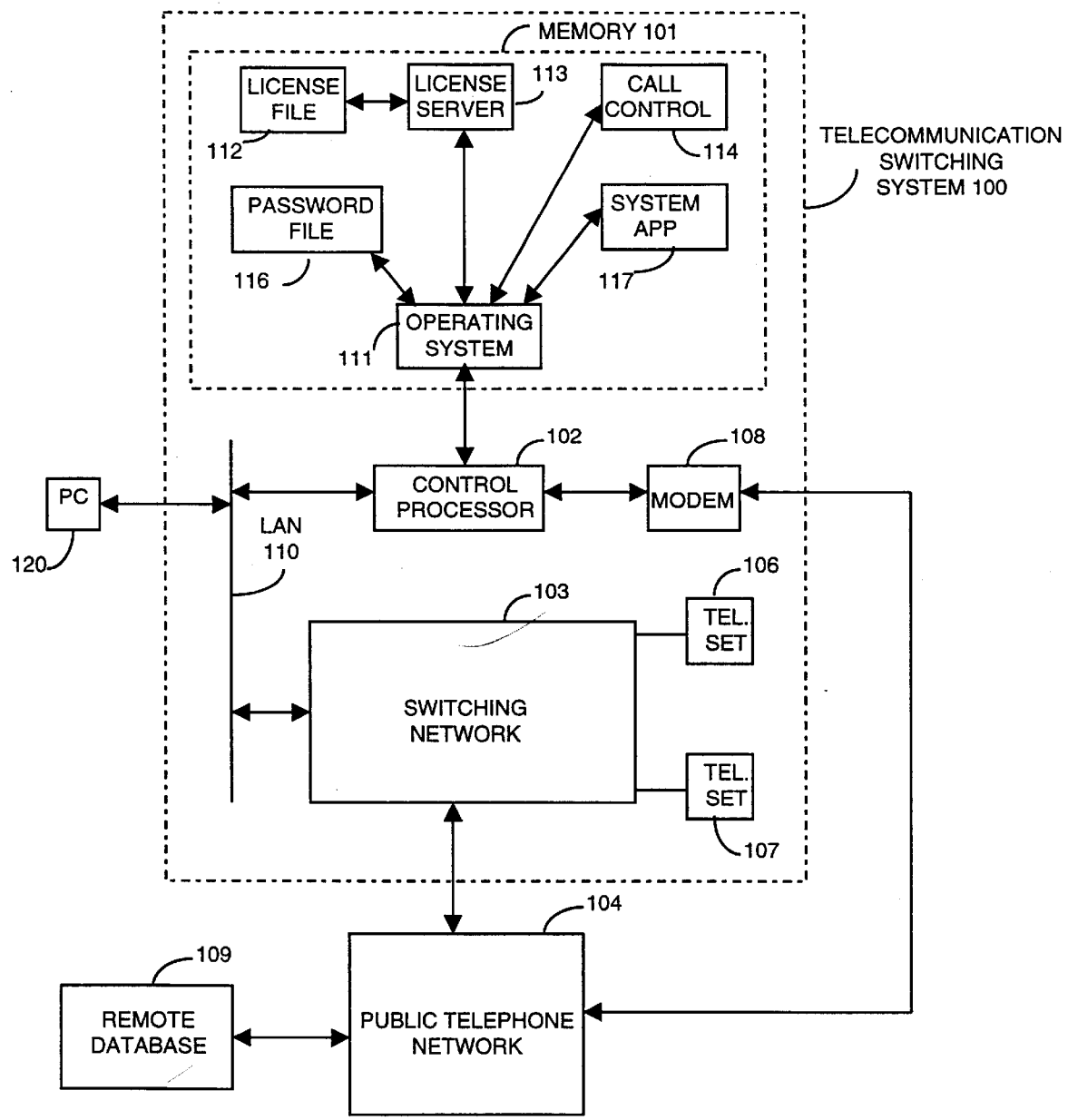
FIG. 1 illustrates, in block diagram form, the arrangement of software within telecommunication switching system 100.

FIG. 1 illustrates telecommunications switching system 100 interconnected to public telephone network 104. switching system 100 includes telephone sets 106–107. The features and operations provided by telecommunication switching system 100 to telephones 106–107 and its interactions with public telephone network 104 are well known in the art. Control processor 102 executes call control application 114 via operating system 111 to perform the telecommunication functions and features. Control processor 102 communicates with switching network 103 via LAN 110. One skilled in the art could readily envision that control processor 102 could communicate with switching network 103 via a direct connection such as a connection via the processor bus of control processor 102. Operating system 111 is a conventional operating system allowing for the execution of applications such as call control application 114 and for the intra-application communication of messages. Personal computer (PC) 120 is utilized by service personnel to administer telecommunication switching system 100. These functions of the service personnel will be described later. Switching network 103 provides all of the necessary telecommunication switching and interfacing that is required in telecommunication switching system 100. Modem 108 is directly connected to control processor 102 so that control processor 102 can contact remote database 109 via public telephone network 104. One skilled in the art could readily envision that modem 108 could be interconnected to control processor 102 via LAN 110. Similarly, remote database 109 can establish a communication channel with control processor 102 via public telephone network 104 and modem 108.

In accordance with the invention, at initialization and periodically during its execution, call control application 114 sends an encrypted message to license server 113 via operating system 111. The encrypted message requests permission to run and to obtain a list of permitted features. The encrypted message also includes the version number for call control application 114. License server 113 is responsive to the encrypted message to access license file 112. License server 113 decrypts license file 112 in order to obtain the list of permitted features, version number of call control application 114, and the serial number of control processor 102. License server 113 via operating system 111 then reads the serial number from control processor 102. License server 113 then compares the serial number obtained from license file 112 and the serial number from control processor 102. If there is a match, license server 113 then compares the version number received from call control application 114 with the version number contained in license file 112. If there is a match, license server 113 transmits an encrypted message to call control application 114 informing it that it can run and the features that may execute. In addition, license file 112 can contain an expiration date that license server 113 checks to see if it has expired. If the expiration date has expired, license server 113 will not give call control application 114 permission to execute. Note, that any other applications running on telecommunication switching system 100 can utilize the same mechanism as call control application 114 to determine if they are to be allowed to execute and what options they may execute.

License file 112 must be obtained from remote database 109. Similarly, password file 116 must also be provided by remote database 109. Password file 116 allows a user utilizing PC 120 to gain access and to perform certain operations with respect to telecommunication switching system 100. An example of a common task that a service personnel might perform via PC 120 would be to shut telecommunication switching system 100 down or perform routine maintenance functions. Remote database 109 can initialize the downloading of license file 112 via public telephone network 104 and modem 108. When this downloading occurs, control processor 102 will execute system application 117 to properly store the license file in license file 112 as it is received from remote database 109. Similarly, control processor 102 can also automatically request the license file 112 from remote database 109. In addition, a user of PC 120 can request a copy of the license file by logging on to remote database 109 via public telephone network 104. The PC 120 then loads the license file into memory 101 via LAN 110 and control processor 102.

When a request is made of remote database 109 for a copy of the license file, remote database 109 verifies the identify of the entity requesting the copy, accesses the file defining the serial number, features and version numbers that should be included in the license file and the password file, and then, transmits the copy of the license file to telecommunication switching system 100.

Figure 2:
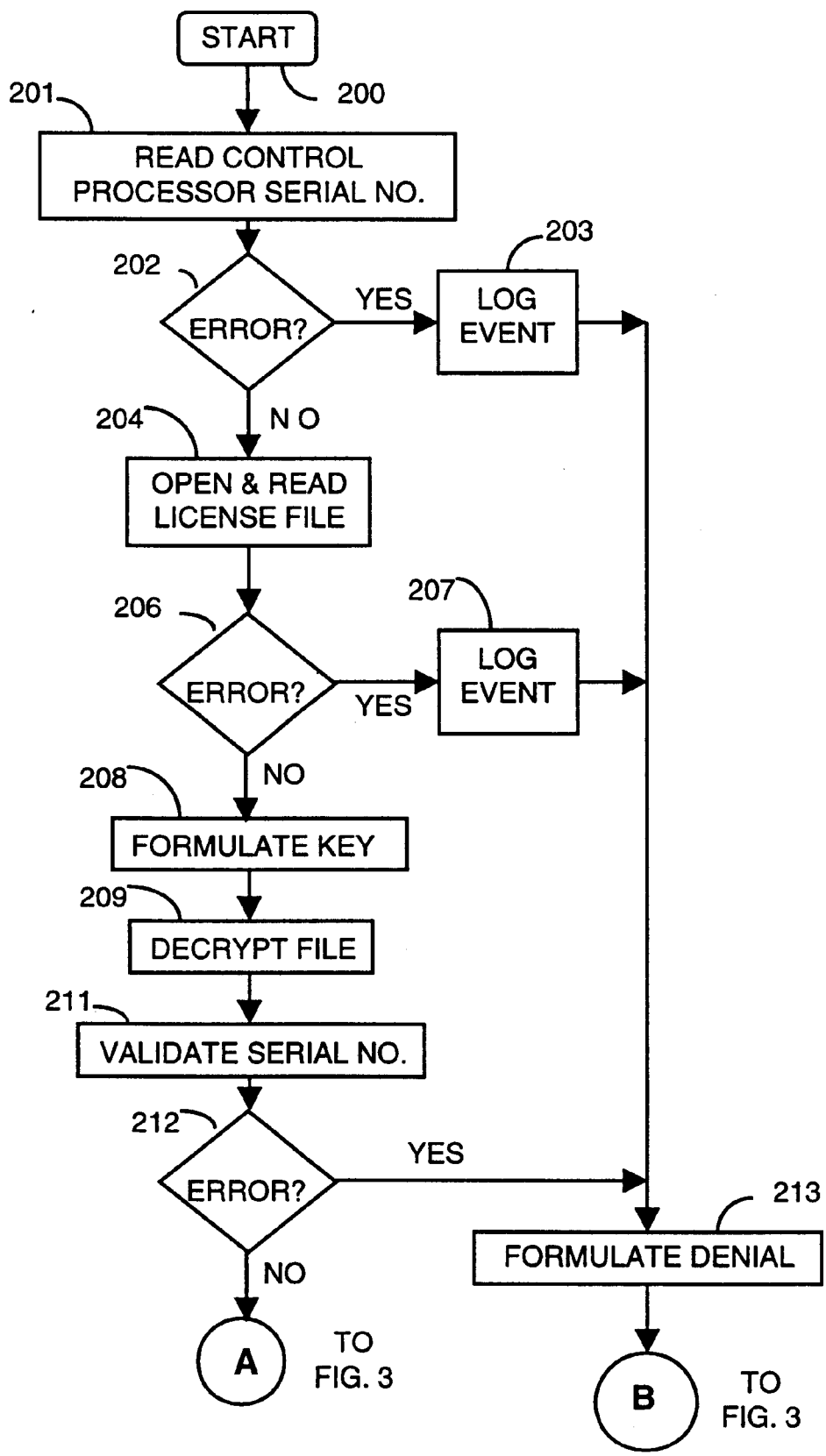
FIG. 2 illustrates, in flow chart form, the steps performed by a license server.

FIGS. 2 and 3 illustrate, in flowchart form, the steps performed by license server 113 in response to an encrypted message from call control application 114. The receipt of the encrypted message is detected by block 200 which transfers control to block 201. The latter block reads the serial number from control processor 102 before transferring control to decision block 202. The latter decision block verifies that a serial number has been read from control processor 102. If an error occurs, control is transferred to block 203 which logs an error before transferring control to block 213. Block 213 formulates a message indicating that call control application 114 can not execute and transfers this to block 309 of FIG. 3 whose operation will be described later. Returning to decision block 202, if an error has not occurred, license file 112 is read. Decision block 206 verifies that an error did not occur in the reading of license file 112 from memory 101. If an error did occur, control is transferred to block 207 which logs the fact that an error occurred before transferring control to block 213. If an error did not occur, control is transferred to block 208 which formulates the key to be utilized in decrypting license file 112. One skilled in the art could readily envision that license file 112 could be encrypted with more than one key, and that block 208 would need to formulate all of the necessary keys. After license file 112 has been decrypted, control is transferred to block 211 which compares the serial number stored by license server 113 and the serial number read from control processor 102. Decision block 212 determines if an error or mis-match has occurred in the comparison of the serial numbers. If the answer is yes, control is transferred to decision block 213. If the answer is no in decision block 212, control is transferred to block 301 of FIG. 3.

Block 301 obtains the present date and time before transferring control to decision block 302. The latter decision block compares the present date and time with that read from license file 112 to determine if the execution of call control application 114 has expired. If the answer is yes, control is transferred to block 307 which formulates a denial to be sent back to call control application 114 before transferring control to block 309. If the answer is no in decision block 302, control is transferred 303 which determines the information being requested by call control application 114 before transferring control to block 304. Block 304 decrypts the message that had been received call control application 114. In particular, it verifies that the version number being requested by call control application 114 are allowed by the information that is in license file 112. After performing these operations in block 304, control is transferred to block 306 which determines if the requested information and version number mis-match. If the answer is yes, control is transferred to block 307.

If the answer is no in decision block 306, control is transferred to block 308 which formulates a response to be transmitted to call control application 114 informing it of the features that it may execute before control is transferred to block 309. Block 309 encrypts the various messages received either from block 213, block 308, or block 307 before transferring control to block 311. Block 311 transmits the encrypted message to call control application 114 via operating system 111.

Of course, various changes and modifications to the illustrated embodiment described above will be apparent to those skilled in the art. These changes and modifications can be made without departing from the spirit and scope of the invention and without diminishing its intended advantages. It is therefor intended that such changes and modifications by covered by the following claims.

What is claimed is:

1. A method for protecting actuation of a plurality of features and a plurality of controlled applications, comprising the steps of:

sending a first message to a license server, by one of the plurality of controlled applications, requesting permission to continue execution and identification of ones of the plurality of features that are to be provide by the one of the plurality of controlled applications;

obtaining, by the license server, a first serial number of a processor on which both the license server and the one of the plurality of controlled applications are executing;

accessing, by the license server, a license file to obtain a second serial number of a processor on which the one of the plurality of controlled applications is allowed to execute and identification of an allowed set of the plurality of features that the one of the plurality of controlled applications is to provide;

comparing, by the license server, the first serial number with second serial number;

transmitting, by the license server, a second message to the one of the plurality of controlled applications indicating that the one of the plurality of controlled applications can continue execution and including identification of the allowed set of the plurality of features upon the first serial number and second serial number being equal;

continuing excution, by the one of plurality of the controlled applications, in response to the second message; and providing the allowed set of the plurality of features in response to the second message by the one of the plurality of controlled applications.

2. The method of claim 1 wherein the step of sending comprises the step of including a first version number of the one of the plurality of controlled applications in the first message;

the step of accessing comprises the step of reading a second version number from the license file of a set of the plurality of controlled applications that are allowed to execute on the processor defined by the first serial number;

the step of comparing further compares the first version number with the second version number; and the step of transmitting further transmits the second message upon upon the first serial number and second serial number being equal and the first version number and the second version number being equal.

3. The method of claim 2 wherein the license file is encrypted and the step of accessing further comprises the step of decrypting the license file.

4. The method of claim 3 wherein the first message is encrypted and the step of obtaining further comprises the step of decrypting the first message.

5. The method of claim 4 wherein the first and second messages are communicated via an operating system.

6. The method of claim 3 wherein the second message is encrypted and the step of continuing excution comprises the step of decrypting the second message.

7. The method of claim 6 wherein the first and second messages are communicated via an operating system.

8. The method of claim 1 wherein the step of transmitting further transmits a third message to the one of the plurality of controlled applications indicating that the one of the plurality of controlled applications should cease execution upon the first serial number and second serial number not being equal.

9. The method of claim 8 further comprises the step of ceasing execution, by the one of the plurality of controlled applications, upon receipt of the third message.

10. An apparatus for protecting actuation of a plurality of features and a plurality of controlled applications, comprising:

one of the plurality of controlled applications sending a first message to a license server requesting permission to continue execution and identification of ones of the plurality of features that are to be provide by the one of the plurality of controlled applications;

the license server obtaining a first serial number of a processor on which both the license server and the one of the plurality of controlled applications are executing;

the license server further accessing a license file to obtain a second serial number of a processor on which the one of the plurality of controlled applications is allowed to execute and identification of an allowed set of the plurality of features that the one of the plurality of controlled applications is to provide;

the license server further comparing the first serial number with second serial number;

the license server further transmitting a second message to the one of the plurality of controlled applications indicating that the one of the plurality of controlled applications can continue execution and including identification of the allowed set of the plurality of features upon the first serial number and second serial number being equal;

the one of plurality of the controlled applications further continuing execution in response to the second message; and the one of the plurality of controlled applications further providing the allowed set of the plurality of features in response to the second message.

11. The apparatus of claim 10 wherein the one of the plurality of controlled applications further including a first version number of the one of the plurality of controlled applications in the first message;

the license server further reading a second version number from the license file of a set of the plurality of controlled applications that are allowed to execute on the processor defined by the first serial number;

the license server further compares the first version number with the second version number; and the license server further transmits the second message upon the first serial number and second serial number being equal and the first version number and the second version number being equal.

12. The apparatus of claim 10 wherein the license server further transmits a third message to the one of the plurality of controlled applications indicating that the one of the plurality of controlled applications should cease executing upon the first serial number and second serial number not being equal.

13. The apparatus of claim 12 wherein the one of the plurality of controlled applications further ceasing execution upon receipt of the third message.

* * * * *